Sept. 3, 1968 D. L. KNAUSS 3,400,306

IRRADIATED TEMPERATURE COMPENSATED ZENER DIODE DEVICE

Filed Jan. 18, 1965

INVENTOR.
DALTON L. KNAUSS

BY McLaughlin, Cahill & Drummond

ATTORNEYS 3,400,306
Patented Sept. 3, 1968

3,400,306

IRRADIATED TEMPERATURE COMPENSATED ZENER DIODE DEVICE

Dalton L. Knauss, Scottsdale, Ariz., assignor to Dickson Electronics Corp.

Filed Jan. 18, 1965, Ser. No. 426,207
18 Claims. (Cl. 317—234)

ABSTRACT OF THE DISCLOSURE

A temperature compensated Zener diode device produced by subjecting a PN junction formed in a semiconductor material to irradiation substantially in excess of the irradiation naturally occurring in the atmosphere to alter the temperature coefficient thereof.

The present invention pertains to temperature compensated Zener diode devices, and more specifically, to a Zener diode device and method for constructing same to yield a device having an improved temperature coefficient.

It is well-known in the prior art to minimize the temperature dependency of the Zener voltage of a Zener diode by connecting the Zener diode in series with forward-biased diodes having a temperature coefficient opposite to that of the Zener diode. The forward-biased diodes and the Zener diode are then packaged as a single unit so that the temperature dependency of the Zener diode is balanced by the forward-biased diodes. Thus, the positive temperature coefficient of the Zener diode would be cancelled by the negative temperature coefficient of the forward-biased diode, a sufficient number of forward-biased diodes being chosen to provide a negative temperature coefficient equal to the positive coefficient of the Zener diode. Ideally, a situation that rarely exists, as will be explained more fully hereinafter, the temperature coefficient of the package will equal zero. Unfortunately, the ideal situation rarely obtains, and it thus becomes necessary to segregate the constructed temperature compensated Zener diodes according to their respective temperature coefficients; those approaching the temperature coefficient of zero representing a very small fraction of the total number of devices processed.

It is therefore an object of the present invention to provide a temperature compensated Zener diode device having a temperature coefficient approaching zero.

It is still another object of the present invention to provide a method for constructing temperature compensated Zener diode devices and for improving devices already constructed.

It is still another object of the present invention to increase the yield of temperature compensated Zener diodes having desirably low temperature coefficients.

It is still another object of the present invention to provide a method for producing temperature compensated Zener diode devices at a cost substantially below the cost of temperature compensated Zener diodes produced by prior art methods.

Other objects and advantages of the present invention will become apparent to those skilled in the art as the description thereof proceeds.

Briefly, in accordance with one embodiment of the present invention, a temperature compensated Zener diode is formed by connecting a diffused junction Zener diode in series with two forward-biased diffused junction diodes. The forward-biased diodes are chosen in accordance with their negative temperature coefficient to counterbalance the positive temperature coefficient of the Zener diode. The diodes are then packaged in accordance with usual assembling techniques and are then tested and segregated in accordance with the temperature coefficient classification in which they fall. Those temperature compensated Zener diodes that fall in selected temperature coefficient classifications are then subjected to irradiation of a prescribed type and dosage. The type of the radiation as well as the dosage and dose rate may be varied in accordance with the total temperature coefficient change desired. The resulting temperature compensated Zener diode devices produced in accordance with the teachings of the present invention have improved temperature coefficients. Further, the total number of temperature compensated Zener diodes falling within the desirable classification of temperature coefficient (coefficient close to zero) may substantially be increased and a larger percentage of the total number of devices constructed will fall within the more desirable classifications of temperature coefficient.

The present invention may best be described by reference to the accompanying drawings in which.

Figures 1, 2:
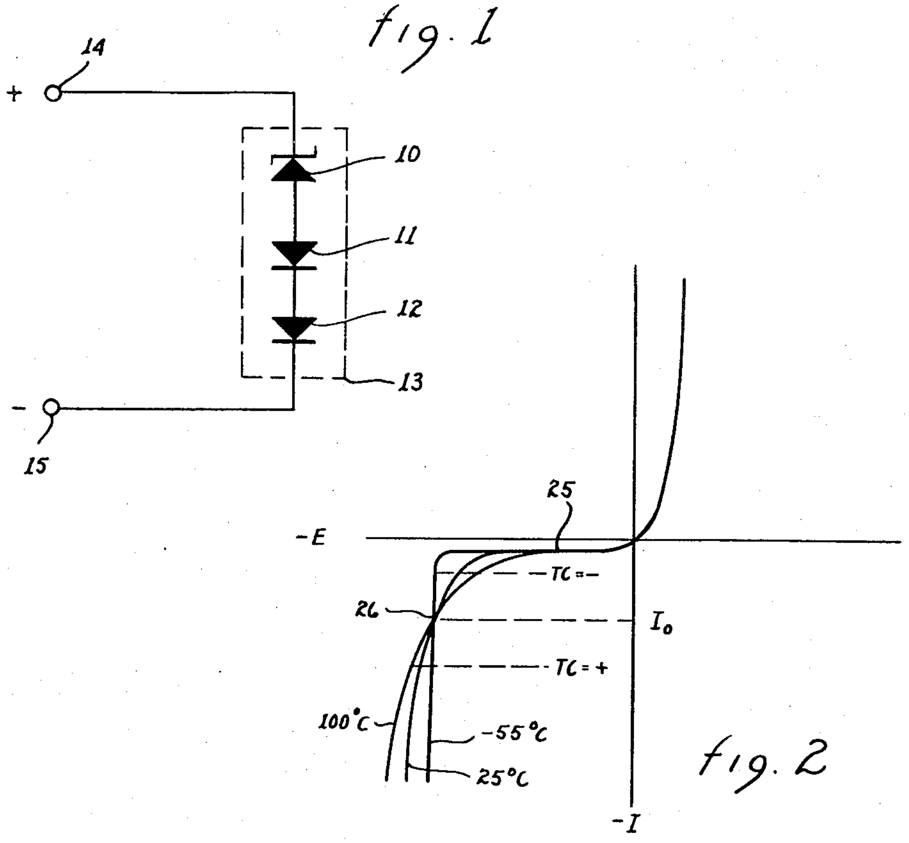
FIGURE 1 is a schematic illustration showing a temperature compensated Zener diode device.
FIGURE 2 is an idealized family of curves showing the temperature dependency of the voltage-current characteristic of a Zener diode.

Referring to FIGURE 1, a temperature compensated Zener diode device is schematically represented. The Zener diode 10 is connected in series with forward-biased diodes 11 and 12 and is packaged or incapsulated as indicated by the dotted line 13. The device may then be connected to terminals such as those indicated at 14 and 15 and, when proper voltage is applied to the terminals 14 and 15, the Zener diode 10 will maintain a relatively constant voltage drop thereacross as will the forward-biased diodes 11 and 12. Ideally, the Zener diode acts as an open circuit until the Zener voltage is reached whereupon any increase in current through the Zener diode does not result in a corresponding increase in voltage. This relationship of current versus voltage in a Zener diode is illustrated in FIGURE 2.

Referring to FIGURE 2, the curvature of the characteristics indicated therein are greatly exaggerated to facilitate the explanation of the phenomena of temperature dependency. When a Zener diode becomes back-biased, a very small current will flow as indicated by the portion 25 of the curves shown in FIGURE 2. When a predetermined voltage, called the Zener voltage, is reached, the junction of the Zener diode breaks down; any further attempt to increase the voltage (increase the negative voltage) will result in a greatly-increased current. Thus, the Zener diode acts as a voltage reference and, ideally, this voltage reference will maintain its reference value throughout a wide range of temperature and current. However, an inspection of the curves of FIGURE 2 indicate that the Zener diode is current sensitive; that is, even after the breakdown voltage has been reached, the Zener diode does have an incremental resistance. Further, the incremental resistance varies with temperature as indicated in FIGURE 2 by the exaggerated changes in slope between —55° C. and 100° C. It is also interesting to note that the curves of FIGURE 2, representing the same Zener diode characteristic at different temperatures, cross each other in the vicinity of a point 26 corresponding to a current. $I_0$. It would therefore appear that if it were possible to construct a Zener diode so that its characteristic at a wide variety of temperatures would all pass through a given point, and if this point represented an operating current that could carefully be maintained, then it would be unnecessary to compensate for temperature variations of the Zener voltage. Unfortunately, manufacturing techniques do not provide a means for reproducing identical Zener diodes; rather, the design current $I_0$ and the Zener voltage are chosen in an attempt to produce Zener diodes having characteristics that pass through a point on the volt ampere characteristics such as the point 26 of FIGURE 2. The result of this attempt is a group or "batch" of Zener diodes having temperature coefficients randomly dispersed about the desired zero temperature coefficient.

Referring to FIGURE 2, it may be seen that those diodes whose operating currents are greater than $I_0$ will have a positive change in voltage with an increase in temperature, thereby representing a positive temperature coefficient. Conversely, those Zener diodes having operating currents less than $I_0$ will have a decreasing Zener voltage with increasing temperature or a negative temperature coefficient. Temperature coefficients are generally given in units of percentage change in Zener voltage per degree centigrade (percent Δv./° C.) or millivolts per degree centigrade (mv./° C.) Assuming that an attempt has been made to manufacture temperature compensated Zener diodes having a temperature coefficient of zero percent Δv./° C., the following table illustrates the range of temperature coefficients that may be obtained:

TABLE I

| Temperature, coefficient (percent Δv./° C.) | Percent devices in group | Cumulative, percent usable |
|---|---|---|
| ±.0005 | 15 | 15 |
| ±.0010 | 20 | 35 |
| ±.0020 | 50 | 85 |
| ±.0050 | 14 | 99 |
| ±.0100 | 1 | 100 |

Referring to Table I, it may be seen that only approximately fifteen percent of the temperature compensated Zener diodes come within five ten-thousandths of a percent per degree centigrade and thus are considered sufficiently close to a zero temperature coefficient for high precision applications. This relatively small percentage of the total number of diodes processed renders the cost of such diodes exceedingly high. If a designer is willing to sacrifice the precision represented by the five ten-thousandths of a percent per degree centigrade group, he may choose to use diodes having a temperature coefficient of one-thousandths percent Δv./° C. and will thus be able to use up to thirty percent of the diodes processed. Similarly, if the application of the Zener diode merely calls for a temperature compensation of plus or minus five-thousandths percent Δv./° C., then the process will yield ninety-nine percent usable devices. The price differential between the precision temperature compensated diodes (those having a temperature coefficient of five ten-thousandths percent Δv./° C. or better) and the remaining groups of temperature compensated Zener diodes represents a substantial factor in design criteria to avoid the utilization of temperature compensated Zener diodes whenever possible. Indeed, attempts have been made to maintain the ambient temperature of such diodes within very narrow limits to avoid the use of expensive precision devices.

The present invention contemplates the utilization of the techniques thus far described in the manufacture of temperature compensated Zener diode devices; however, the teachings of this invention enable the selection of temperature compensation to ultimately substantially increase the percentage of devices falling within the more desirable (and heretofore considerably more expensive) precision category having a temperature coefficient of five ten-thousandths of a percent voltage change per degree centigrade or better. The mechanism by which the present invention accomplishes the desired end is irradiation. Considerable experimentation has been conducted in regard to the effects of radiation on semi-conductor materials. The conclusion of these many studies has always been the degree of "damage" caused by radiation. The effects of radiation on semi-conductor materials has been treated as an undesirable consequence of the necessary application of certain semi-conductor devices in particular applications such as space technology and other instances where radiation cannot be avoided. It has been suggested by numerous authorities, and is in fact a known "remedy" that radiation effects in semi-conductors can be removed by post-irradiation heat treatment or annealing. Thus, the prior art has approached irradiation of semi-conductor devices as an environmental damage-producing fact that must be lived with and which requires as many design expedients as possible to avoid. Further, to emphasize the characterization by the prior art of radiation as damaging, the practice has grown of annealing "damaged" semi-conductor materials and devices to cure defects caused thereby.

Although scientific investigation continues, it would appear that the important effects of radiation on semi-conductor materials are the production of so-called defects such as vacancies, interstitials, impurity atoms, and thermal spikes. In addition to these defects, there are certain ionization effects which may have a bearing on the generation of some of the previously-mentioned defects. Briefly, vacancies are actual atomic vacancies created within the lattice of the crystalline structure of the semi-conductor material created by collisions of bombarding energetic particles with atoms of the lattice. Interstitials are atoms that come to rest in a non-equilibrium position within the lattice network and therefore do not fall within the usual crystalline structure of the semi-conductor material. Impurity atoms, not believed to be overly significant, are the result of transmutation of a lattice atom derived from neutron capture. A thermal spike is the name generally given to minute faults in the crystal lattice caused by extremely high energy and rapid heating to melting with subsequent freezing in localized areas, with the result that a defect in the lattice structure is produced.

Ionization may result from passage of charged particles or gamma rays through a material and this passage may result in a variety of effects, the most important of which appear to be the production of liberated electrons which in turn become bombarding particles to ultimately produce interstitials and vacancies. While the basic physical phenomena is not thoroughly understood, it is believed that the generation of these effects by irradiation in semi-conductor materials produces a change in temperature coefficient of temperature compensated Zener diodes through the generation of vacancies, interstitials, impurity atoms, and thermal spikes. It has been shown that these defects form excellent recombination centers and that the number of recombination centers effects the recombination rate. Temperature affects minority carrier concentration and also minority carrier lifetime; however, lifetime also depends on the recombination rate which, as mentioned above, is affected by the number of recombination centers available. It is therefore believed that the physical mechanism involved in the present invention is the generation of an increased number of recombination centers to thereby affect the recombination rate and reduce the temperature dependency of the temperature compensated Zener diode. Thus, a means is afforded for selecting the type of radiation to be utilized to enhance the temperature coefficient of the temperature compensated Zener diode. The equivalents of the various types of irradiation may be found in the calculated number of atomic displacements caused by the various types of irradiation. While direct experimental evidence is not available in regard to the actual rates of displacements, calculations can be made to show the following rough equivalents:

TABLE II

| Type of radiation: | Displacement—Producing efficiency |
|---|---|
| Electrons (4.5 mev.) | 1 |
| Deuterons (4.5 mev.) | $5.64\times10^2$ |
| α-Particles (4.5 mev.) | $3.45\times10^4$ |
| Fast neutrons | 1.5 |
| γ-Rays | $1.4\times10^{-3}$ |

Table II indicates the relative displacement producing effect of the various types of radiation. As a basis for comparison, the displacement production rate of 4.5 million electron volt (mev.) electrons was taken as unity and the remainder of types of radiation and the displacement production rates are given in terms realtive to the electron irradiation displacement production rate. Thus, the displacement producing efficiency is a value relative to electron irradiation.

Figure 3:
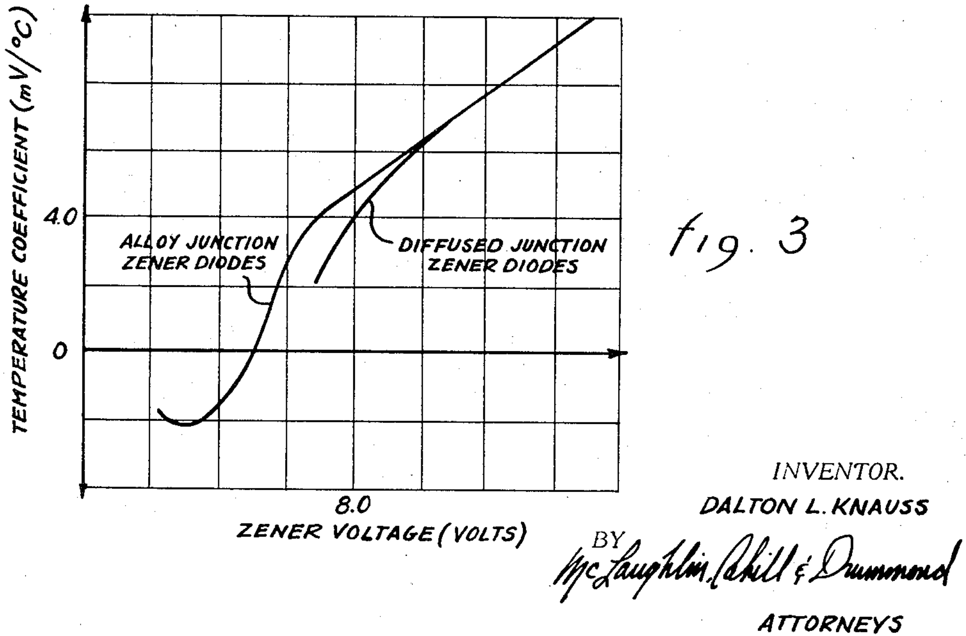
FIGURE 3 is a curve useful for describing the present invention and represents a plot of Zener voltage versus temperature coefficient.

The present invention may now be described in terms of specific examples. Referring to FIGURE 3, it will be assumed that it is desired to produce temperature compensated Zener diode devices for use in a circuit that will operate with a Zener current of 7.5 milliamps. The curve of FIGURE 3 represents the availability of various Zener voltages versus the temperature coefficients concomitant with the respective Zener voltages for both diffused junction Zener diodes and alloy junction Zener diodes. The following examples are based upon the utilization of a diffused junction Zener diode having a Zener voltage of eight volts comprising basically P-type material and having a resistivity of approximately 0.008 ohm centimeter. As may be seen by reference to FIGURE 3, a positive temperature coefficient of four mv./° C. may be expected with this type of Zener diode. To compensate for this temperature coefficient, two forward-biased diffused junction diodes, constructed of P-type material and having a resistivity of approximately 2.5 ohm centimeters, may be connected in series and packaged with the Zener diode; each of the forward-biased diodes having a negative temperature coefficient of two mv./° C. Thus, theoretically, the resulting Zener diode device will have a zero temperature coefficient; however, as indicated previously, results of this type of design will yield a randomly dispersed temperature coefficient on either side of zero mv./° C. The voltage for which the temperature compensated Zener diode device will be used will be the Zener voltage of eight volts plus the forward voltage drop of the two forward-biased diodes, which normally is 0.65 volt per diode, or a total of 9.3 volts for both the Zener diode and the forward-biased diodes.

The preparation and treatment of temperature compensated Zener diode devices may take place as follows:

*Example 1*

Temperature compensated Zener diodes are prepared in accordance with the above-defined process using P-type material with subsequent diffusion to form an eight-volt Zener diode having a positive temperature coefficient of approximately four mv./° C. The P-type material used has a resistivity of .008 ohm centimeters. The Zener diode thus produced is packaged in electrical series with two forward-biased diffused junction diodes, also of basic P material, the resistivity of the material used in the forward-biased diodes being 2.5 ohm centimeters. The forward-biased diodes have a combined forward voltage drop of 1.3 volts, thus yielding a temperature compensated Zener diode having a voltage of 9.3 volts. The temperature coefficient of the combined forward-biased diodes is approximately equal and opposite to that of the Zener diodes; therefore, the temperature compensated device will have a nominal temperature coefficient of zero mv./° C. The devices thus produced are then segregated in accordance with their temperature coefficient in the manner described in connection with Table I. The groups are further subdivided into positive and negative temperature coefficients. Those devices having negative temperature coefficients are then bombarded by 3 mev. electrons for a total dosage of from five to sixty megarads. The temperature coefficients of the devices, after irradiation, will have been raised approximately one-tenth of a mv./° C. so that those devices having a negative temperature coefficient of 0.1 mv./° C. will now have a temperature coefficient of zero, and those devices having a temperature coefficient larger than −0.1 mv./° C. will now more closely approach a zero temperature coefficient. The devices chosen to be irradiated are chosen so that the increased, or more positive, temperature coefficient induced by the irradiation will bring the ultimate temperature coefficient close to or at zero.

*Example 2*

Temperature compensated Zener diodes are constructed having a nominal temperature coefficient deliberately chosen to be slightly negative. The distribution of temperature coefficients in the group thus processed are preponderately negative. The group is then segregated into subgroups in accordance with the magnitude of their respective temperature coefficients. Each subgroup, having a negative temperature coefficient, is then subjected to 3 mev. electron bombardment to induce a positive-going change in the respective temperature coefficients. The devices are once again classified by temperature coefficient and those having the most negative temperature coefficient remaining after irradiation may then be re-irradiated to increase total dosage.

*Example 3*

Temperature compensated Zener diode devices are prepared as described above and are classified in accordance with their respective temperature coefficients. The devices are further grouped into subgroups of positive and negative temperature coefficients and those devices having the negative temperature coefficients are subjected to fast neutron bombardment to produce a positive going change in the respective temperature coefficients.

*Example 4*

Prepare and segregate temperature compensated Zener diodes as indicated above. Irradiate those devices having negative temperature coefficients by bombardment with charged particles from the group of charged particles consisting of electrons, deuterons, and alpha particles, and then reclassifying the irradiated devices.

*Example 5*

Temperature compensated Zener diode devices are constructed in accordance with Example 1. After irradiating as set forth in said example, those devices having temperature coefficients considerably more negative than 0.1 mv./° C., are irradiated again for a total dose not in excess of one hundred megarads to render their respective temperature coefficients more positive, or less negative, and thus approach a temperature coefficient of zero.

Irradiation of temperature compensated Zener diodes is particularly effective in producing an improvement in the temperature dependency of the device when the bombarding particles are charged particles, such as electrons, deuterons, and alpha particles. However, neutrons and gamma rays may produce the same effect. Fast neutrons have approximately the same displacement producing efficiency as electrons, but have the undesirable effect of rendering the bombarded device radioactive and thus difficult to handle. The examples given were predicated upon the utilization of a basic P-type material having a diffused junction; improvement of the temperature compensation of the device may also be achieved through irradiation when the basic material is N-type and/or when the junction is an alloy junction. Depending on the type of irradiation utilized, the expense, per device, of the radiation may amount to an insignificant portion of the total cost of fabrication of the temperature compensated Zener diode. Even the most expensive irradiation techniques will nevertheless represent a substantial savings in the total cost of the resulting device when the temperature coefficient can be substantially improved and the percentage yield of precision temperature compensated Zener diodes out of a processing batch of diodes is substantially increased.

The method of the present invention may advantageously be practiced by the use of space radiation to change the temperature coefficient characteristics of temperature compensated Zener diodes. For example, a circuit may be designed using a temperature compensated Zener diode and may be placed in such a manner on a space traversing vehicle such that the inherent radiation changes the temperature compensation and temperature coefficient to effect a predetermined and designated vehicular operation. The same concept may employ a minute amount of radioactive material contiguous with the temperature compensated Zener diode so that the irradiation of the Zener device will cause a concomitant change in the temperature coefficient. The present method may also be used to adjust the temperature coefficient to a desired value other than zero; such coefficients are frequently useful in those applications requiring compensating voltage changes to effect compensation for temperature-resulting changes in circuit characteristics.

The advantages gained by the present invention are not affected by elevated temperatures; experiments have shown that within the realm of temperatures that devices of this type are normally used, the advantages gained by irradiation are unaffected.

While the present invention has been described in terms of specific embodiments such as specific types of irradiation and specific semi-conductor materials, it will be apparent to those skilled in the art that other materials and a variety of irradiation sources may be used. The mechanism by which the temperature coefficient is improved or altered is not thoroughly understood and techniques of investigation would require substantial assumptions with a resulting theoretical conclusion. It is therefore proposed that the method and device of the present invention is developed in accordance with the displacement of atoms in the crystal lattice of the semi-conductor material. Irradiation of various semi-conductor materials will yield slightly different results such as, for example, irradiation of germanium and silicon may have the same qualitative but not the same quantitative effect. It is therefore anticipated that the present invention may be practiced with a substantial variety of semi-conductor materials including silicon and germanium by appropriate modification of dose rates, dosage, irradiation sources, and other variables readily chosen by the process technician. Combinations of the various types of irradiation may be used such as alpha particle bombardment to produce a very marked change in the temperature coefficient of those devices having temperature coefficients varying greatly from zero. It will therefore be apparent to those skilled in the art that many modifications may be made in the present invention without departing from the spirit and scope thereof.

I claim:

1. A temperature compensated Zener diode device produced by forming a first PN junction having a predetermined voltage-current characteristic; subjecting said PN junction to irradiation substantially in excess of natural atmospheric irradiation; forming a second PN junction having a predetermined voltage-current characteristic; and connecting said PN junctions oppositely poled to each other.

2. The combination set forth in claim 1 wherein said first PN junction exhibits a positive temperature coefficient and wherein said second PN junction exhibits a negative temperature coefficient.

3. The combination set forth in claim 1 wherein said PN junctions are diffused junctions.

4. The combination set forth in claim 1 wherein said irradiation is electron irradiation.

5. The combination set forth in claim 1 wherein said irradiation is one of a type of irradiation from the group consisting of: electrons, deuterons, alpha particles.

6. The combination set forth in claim 1 wherein said irradiation is deuteron irradiation.

7. The combination set forth in claim 1 wherein said irradiation is alpha particle irradiation.

8. The combination set forth in claim 1 wherein said irradiation is neutron irradiation.

9. The combination set forth in claim 1 wherein said irradiation is gamma ray irradiation.

10. A temperature compensated Zener diode device produced by forming a first PN junction having a predetermined reverse voltage-current characteristic; forming a second PN junction having a predetermined forward voltage-current characteristic; connecting said PN junctions oppositely poled to each other; and subjecting said PN junctions to irradiation substantially in excess of natural irradiation.

11. The combination set forth in claim 10 wherein said first PN junction exhibits a positive temperature coefficient and wherein said second PN junction exhibits a negative temperature coefficient.

12. The combination set forth in claim 10 wherein said PN junctions are diffused junctions.

13. The combination set forth in claim 10 wherein said irradiation is electron irradiation.

14. The combination set forth in claim 10 wherein said irradiation is one of a type of irradiation from the group consisting of: electrons, deuterons, alpha particles.

15. The combination set forth in claim 10 wherein said irradiation is deuteron irradiation.

16. The combination set forth in claim 10 wherein said irradiation is alpha particle irradiation.

17. The combination set forth in claim 10 wherein said irradiation is neutron irradiation.

18. The combination set forth in claim 10 wherein said irradiation is gamma ray irradiation.

References Cited

UNITED STATES PATENTS

| | | | |
|---|---|---|---|
| 3,156,861 | 11/1964 | Dickson | 323—66 |
| 3,165,688 | 1/1965 | Gutzwiller | 318—246 |
| 3,263,092 | 7/1966 | Knauss | 307—88.5 |
| 3,268,739 | 8/1966 | Dickson | 307—88.5 |
| 3,281,656 | 10/1966 | Noble | 323—75 |
| 3,300,710 | 1/1967 | Knauss | 323—17 |

JOHN W. HUCKERT, *Primary Examiner.*

R. F. SANDLER, *Assistant Examiner.*